United States Patent
Sahara et al.

(10) Patent No.: US 12,228,678 B2
(45) Date of Patent: Feb. 18, 2025

(54) ELECTRONIC DEVICE, METHOD FOR CONTROLLING ELECTRONIC DEVICE, AND ELECTRONIC DEVICE CONTROL PROGRAM

(71) Applicant: KYOCERA Corporation, Kyoto (JP)

(72) Inventors: Tooru Sahara, Yokohama (JP); Yutaka Ootsuki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 703 days.

(21) Appl. No.: 17/279,212

(22) PCT Filed: Sep. 3, 2019

(86) PCT No.: PCT/JP2019/034652
§ 371 (c)(1),
(2) Date: Mar. 24, 2021

(87) PCT Pub. No.: WO2020/066497
PCT Pub. Date: Apr. 2, 2020

(65) Prior Publication Data
US 2022/0034995 A1 Feb. 3, 2022

(30) Foreign Application Priority Data
Sep. 26, 2018 (JP) .................... 2018-180775

(51) Int. Cl.
*G01S 7/288* (2006.01)
*G01S 13/28* (2006.01)
(Continued)

(52) U.S. Cl.
CPC .......... *G01S 7/2883* (2021.05); *G01S 13/282* (2013.01); *G01S 13/66* (2013.01); *G01S 13/931* (2013.01);
(Continued)

(58) Field of Classification Search
CPC ...... G01S 7/2883; G01S 7/356; G01S 13/282; G01S 13/66; G01S 13/931; G01S 13/44; G01S 13/584; G01S 13/343
See application file for complete search history.

(56) References Cited

U.S. PATENT DOCUMENTS 6,140,954 A * 10/2000 Sugawara ............. G01S 13/536
367/101
6,518,916 B1  2/2003 Ashihara et al.
(Continued)

FOREIGN PATENT DOCUMENTS

JP   H07209410 A   8/1995
JP   H08-226963 A  9/1996
(Continued)

OTHER PUBLICATIONS

Tetsuro Kirimoto, "5-2 Principles of Radar", Institute of Electronics, Information and Communication Engineers (Knowledge Base), Group 11 Part 2 Chapter 5, Apr. 15, 2011, pp. 8(35)-10(35), IEICE.

*Primary Examiner* — Marc Anthony Armand
(74) *Attorney, Agent, or Firm* — Studebaker & Brackett PC

(57) ABSTRACT

An electronic device detects an object reflecting transmitted waves based on transmitted signals transmitted as the transmitted waves from transmitting antennas and received signals received from receiving antennas as reflected waves obtained by reflection of the transmitted waves. The electronic device determines that the object have been detected when the peak in the result obtained by performing a Fourier transform process on the beat signals generated based on the transmitted and received signals is equal to or higher than a predetermined threshold value. The electronic device sets a predetermined threshold value based on an object detection probability.

12 Claims, 10 Drawing Sheets

(51) Int. Cl.
    *G01S 13/66*     (2006.01)
    *G01S 13/931*     (2020.01)
    *G06F 18/2321*     (2023.01)
    *H01Q 1/32*     (2006.01)

(52) U.S. Cl.
    CPC ....... *G06F 18/2321* (2023.01); *H01Q 1/3233* (2013.01)

(56) References Cited

U.S. PATENT DOCUMENTS

| | | | |
|---|---|---|---|
| 6,861,973 | B2 | 3/2005 | Kishida |
| 9,081,085 | B2 | 7/2015 | Fukuda |
| 2003/0222812 | A1* | 12/2003 | Kishida .................. G01S 13/34 342/115 |
| 2009/0052737 | A1 | 2/2009 | Lycett |
| 2010/0271254 | A1 | 10/2010 | Kanamoto et al. |
| 2014/0313070 | A1 | 10/2014 | Asanuma |
| 2016/0018511 | A1 | 1/2016 | Nayyar et al. |

FOREIGN PATENT DOCUMENTS

| | | |
|---|---|---|
| JP | H11211811 A | 8/1999 |
| JP | 2000003478 A | 1/2000 |
| JP | 2001-116833 A | 4/2001 |
| JP | 2004012186 A | 1/2004 |
| JP | 2007-240317 A | 9/2007 |
| JP | 2008-215918 A | 9/2008 |
| JP | 2008217078 A | 9/2008 |
| JP | 2009174900 A | 8/2009 |
| JP | 2011095989 A | 5/2011 |
| JP | 2012-194083 A | 10/2012 |
| JP | 2017-181276 A | 10/2017 |
| JP | 2018136232 A | 8/2018 |
| WO | 2013069253 A1 | 5/2013 |

* cited by examiner

FIG. 6

| THRESHOLD VALUE Sth [dB] | OBJECT DETECTION PROBABILITY [%] | SUCCESS COUNTS | FAILURE COUNTS |
|---|---|---|---|
| 15 dB | P (15) | OK (15) | NG (15) |
| 14 dB | P (14) | OK (14) | NG (14) |
| 13 dB | P (13) | OK (13) | NG (13) |
| 12 dB | P (12) | OK (12) | NG (12) |
| 11 dB | P (11) | OK (11) | NG (11) |
| 10 dB | P (10) | OK (10) | NG (10) |
| 9 dB | P (9) | OK (9) | NG (9) |

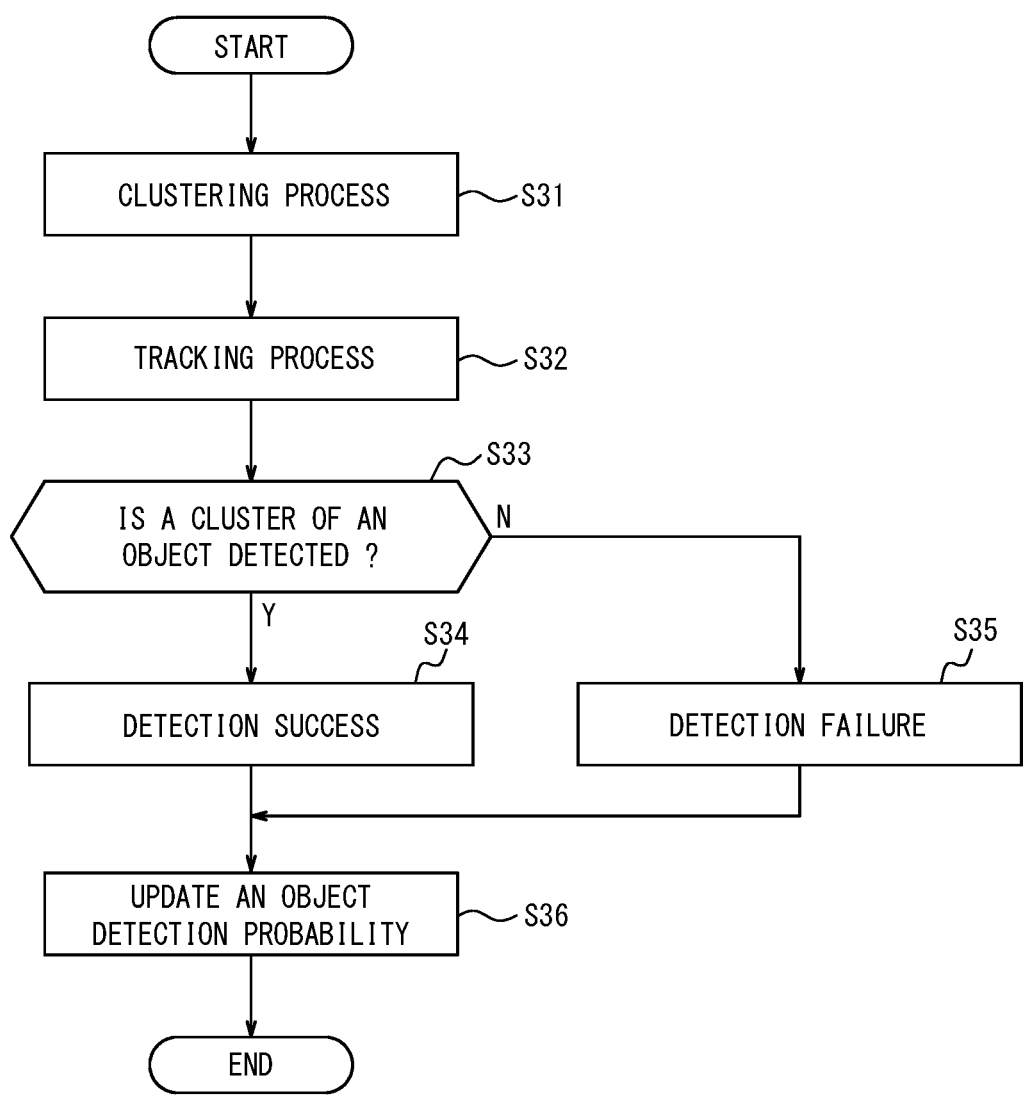

ELECTRONIC DEVICE, METHOD FOR CONTROLLING ELECTRONIC DEVICE, AND ELECTRONIC DEVICE CONTROL PROGRAM

CROSS REFERENCE TO RELATED APPLICATION

This application claims the priority of Patent Application 2018-180775 filed in Japan on Sep. 26, 2018, and the entire disclosure of this previous application is hereby incorporated for reference.

TECHNICAL FIELD

The present disclosure relates to an electronic device, a method for controlling electronic device, and an electronic device control program.

BACKGROUND

For example, in the field of industries related to automobiles, a technique for measuring distance between an own vehicle and an object is important. In particular, in recent years, RADAR (Radio Detecting and Ranging) technique for measuring distance between the own vehicle and the object by transmitting radio waves such as millimeter waves and receiving reflected waves obtained by reflection by the object such as an obstacle has been studied in various ways. The importance of technique for measuring such distances and the like is expected to grow more and more in the future with development of techniques that assist drivers in driving and related to automated driving that automates a part or all of driving.

Further, various techniques for detecting presence of an object by receiving reflected waves obtained by reflection of the transmitted radio waves by a predetermined object, have also been proposed. For example, PLT 1 discloses a technique for improving the safety of a vehicle by making it difficult for the safety system to operate even if an obstacle candidate is erroneously detected. Further, for example, PLT discloses a technique for facilitating detection by radar even for a weakly reflecting object such as a pedestrian. Further, for example, PLT 3 discloses a technique for suppressing inconvenience caused by a millimeter wave radar detecting an object that is not an obstacle.

CITATION LIST

Patent Literature

PLT 1: JP2008217078 A
PLT 2: JP2009174900A
PLT 3: JP2011095989A

SUMMARY

An electronic device according to an embodiment detects an object reflecting transmitted waves based on transmitted signals transmitted from a transmitting antenna as the transmitted waves and received signals received from a receiving antenna as reflected waves obtained by reflection of the transmitted waves. The electronic device determines that the object has been detected when a peak in a result obtained by performing a Fourier transform process on beat signals generated based on the transmitted signals and the received signals is equal to or higher than a predetermined threshold value. The electronic device sets the predetermined threshold value based on an object detection probability.

A method for controlling an electronic device according to an embodiment includes the following steps.

(1) A step of transmitting transmitted signals from a transmitting antenna as transmitted waves.

(2) A step of receiving received signals from a receiving antenna as reflected waves obtained by reflection of the transmitted waves.

(3) A step of detecting an object reflecting the transmitted waves based on the transmitted signals and the received signals.

(4) A step of determining that the object has been detected when a peak in a result obtained by performing a Fourier transform process on beat signals generated based on the transmitted signals and the received signals is equal to or higher than a predetermined threshold value.

(5) A step of setting the predetermined threshold value based on an object detection probability.

An electronic device control program according to an embodiment causes a computer to perform the steps (1) to (5) described above.

BRIEF DESCRIPTION OF THE DRAWINGS

In the accompanying drawings:

FIG. 6 is a diagram for showing an example of a threshold value used for a determination process of an electronic device according to an embodiment.

FIG. 10 is a flowchart for explaining an operation of an electronic device according to an embodiment.

DETAILED DESCRIPTION

It is desirable to improve accuracy of detection in a technique for detecting presence of the predetermined object by receiving reflected waves obtained by reflection of the transmitted waves by a predetermined object (object). An objective of the present disclosure is to provide an electronic device, a method for controlling an electronic device, and an electronic device control program that can improve accuracy of detecting an object having reflected the transmitted waves. According to an embodiment, an electronic device, a method for controlling electronic device, and an electronic device control program that can improve accuracy of detecting an object having reflected transmitted waves can be provided. Hereinafter, an embodiment will be described in detail with reference to the drawings.

An electronic device according to an embodiment, for example, by being mounted on a vehicle such as an automobile (mobile body), can detect a predetermined object existing around the mobile body. For this reason, an electronic device according to an embodiment can transmit transmitted waves from a transmitting antenna installed on a mobile body to surroundings of the mobile body. Further, an electronic device according to an embodiment can receive reflected waves obtained by reflection of the transmitted waves from a receiving antenna installed on the mobile body. At least one of the transmitting antenna and the receiving antenna may be provided, for example, in a radar sensor or the like installed in the mobile body.

Hereinafter, as a typical example, a configuration in which an electronic device according to an embodiment is mounted on an automobile, such as a passenger car as an example of a mobile body will be described. However, mobile bodies on which an electronic device according to an embodiment is mounted is not limited to the automobile. An electronic device according to an embodiment may be mounted on a variety of mobile bodies, such as buses, trucks, motorcycles, bicycles, ships, aircrafts agricultural vehicles such as tractors, fire engines, ambulances, police vehicles, snowplows, cleaning vehicles for cleaning roads, drones, or the like, or on pedestrians. In addition, the electronic devices according to an embodiment are not necessarily limited to be mounted on a mobile body that moves under its own power. For example, a mobile body on which an electronic device according to an embodiment is mounted may be a trailer part towed by a tractor.

Firstly, an example of detecting an object by an electronic device according to an embodiment will be described.

Figure 1:
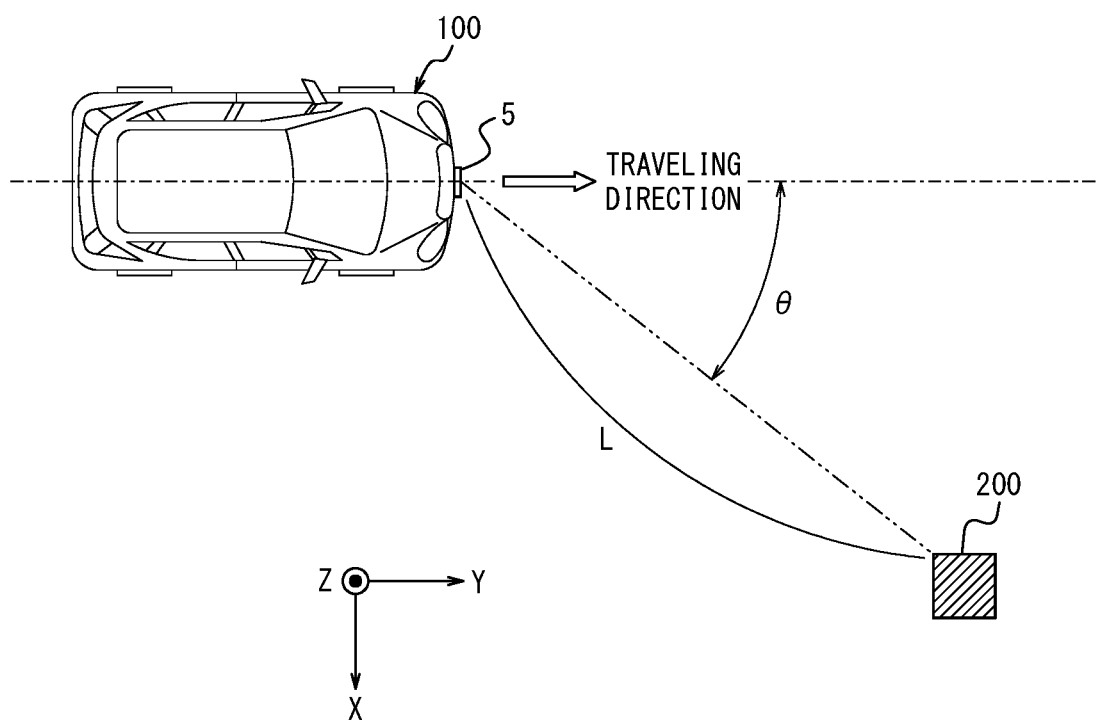
FIG. 1 is a diagram for explaining usage of an electronic device according to an embodiment.

FIG. 1 is a diagram for explaining usage of an electronic device according to an embodiment. FIG. 1 shows an example in which a sensor comprising a transmitting antenna and a receiving antenna according to an embodiment is installed on a mobile body.

In a mobile body 100 shown in FIG. 1, a sensor 5 comprising a transmitting antenna and a receiving antenna according to an embodiment is installed. Further, the mobile body 100 shown in FIG. 1 shall be equipped with an electronic device 1 according to an embodiment (for example, built-in). A specific configuration of the electronic device 1 will be described below. The sensor 5 may comprise, for example, at least one of a transmitting antenna and a receiving antenna. Further, the sensor 5 may also include at least one of other functional parts such as at least a part of a controller 10 included in the electronic device 1 (FIG. 2 or 3), as appropriate. The mobile body 100 shown in FIG. 1 may be an automobile vehicle, such as a passenger car, but may be an arbitrary type of mobile body. In FIG. 1, the mobile body 100, for example, may be moving (traveling or slow traveling) in the Y-axis positive direction (traveling direction) shown in FIG. 1, or may be moving in other directions, or may be stationary without moving.

As shown in FIG. 1, the sensor 5 comprising a plurality of transmitting antennas is installed on a mobile body 100. In the example shown in FIG. 1, only one sensor 5 comprising the transmitting antenna and the receiving antenna is installed in front of the mobile body 100. Here, a position where the sensor 5 is installed in the mobile body 100 is not limited to the position shown in FIG. 1, but may be other positions as appropriate. For example, the sensor 5 as shown in FIG. 1 may be installed on the left, right, and/or rear of the mobile body 100. Further, a number of such sensors 5 may be an arbitrary number of one or more, depending on various conditions (or requirements) such as a range and/or accuracy of the measurement in the mobile body 100.

The sensor 5 transmits electromagnetic waves as transmitted waves from a transmitting antenna. For example, if there is a predetermined object (for example, object 200 shown in FIG. 1) around the mobile body 100, at least a part of transmitted waves transmitted from the sensor 5 is reflected by the object and becomes reflected waves. Then, by receiving such reflected waves by the receiving antenna of the sensor 5 for example, the electronic device 1 mounted on the mobile body 100 can detect the object.

The sensor 5 comprising a transmitting antenna may typically be a radar (RADAR(Radio Detecting and Ranging) sensor that transmits and receives radio waves. However, the sensor 5 is not limited to the radar sensor. The sensor 5 according to an embodiment may be a sensor based on a technique of, for example, LIDAR (Light Detection and Ranging, Laser Imaging Detection and Ranging) by light waves. Further, the sensor 5 according to an embodiment may be a sensor based on the technique of, for example, SONAR (Sound Navigation and Ranging) by sound waves. Such sensors can be configured to include, for example, a patch antenna. Because techniques such as RADAR, LIDAR and SONAR have been already known, detailed descriptions may be simplified or omitted as appropriate.

The electronic device 1 mounted on the mobile body 100 shown in FIG. 1 receives reflected waves obtained by reflection of the transmitted waves transmitted from a transmitting antenna of the sensor 5, from the receiving antenna. In this way, the electronic device 1 can detect a predetermined object 200 existing within a predetermined distance from the mobile body 100. For example, as shown in FIG. 1, the electronic device 1 can measure a distance L between the mobile body 100, which is its own vehicle, and the predetermined object 200. Further, the electronic device can also measure relative speed between the mobile body 100, which is its own vehicle, and the predetermined object 200. Furthermore, the electronic device 1 can also measure an arrival direction (arrival angle θ) in which reflected waves from the predetermined object 200 arrives at the mobile body 100, which is its own vehicle.

Here, the object 200 may be at least one of, for example, an oncoming vehicle traveling in a lane adjacent to the mobile body 100, a vehicle traveling in parallel with the mobile body 100, and a vehicle in front of or behind the mobile body 100 traveling in the same lane as the mobile body 100. Further, the object 200 may be an arbitrary body existing around the mobile body 100, such as motorcycles, bicycles, strollers, pedestrians, guardrails, medians, road signs, sidewalk steps, walls, obstacles, manholes and the like. Furthermore, the object 200 may be moving or stationary. For example, the object 200 may be an automobile parked or stopped around the mobile body 100. In the present disclosure, objects detected by the sensor 5 include inanimate objects as well as organisms such as humans or animals.

In FIG. 1, a ratio of the size of the sensor 5 to the size of the mobile body 100 does not necessarily represent an actual ratio. Further, in FIG. 1, the sensor 5 shows a state of being installed outside the mobile body 100. However, in an embodiment, the sensor 5 may be installed in various positions on the mobile body 100. For example, in an embodiment, the sensor 5 may be installed inside the bumper of the mobile body 100 so that it does not appear on the exterior of the mobile body 100. The position where the sensor 5 is installed on the mobile body 100 may be either outside or inside the mobile body 100. The inside the mobile body 100 may be, for example, the inside a body of the mobile body 100, the inside of bumpers, the inside of headlights, the inside of space of the vehicle or any combination of these.

Hereinafter, as a typical example, the transmitting antenna of the sensor 5 will be described as transmitting radio waves in a frequency band such as millimeter wave (above 30 GHz) or quasi-millimeter wave (for example, around 20 GHz to 30 GHz). For example, the transmitting antenna of the sensor 5 may transmit radio waves with a frequency bandwidth of 4 GHz, such as 77 GHz to 81 GHz.

Figure 2:
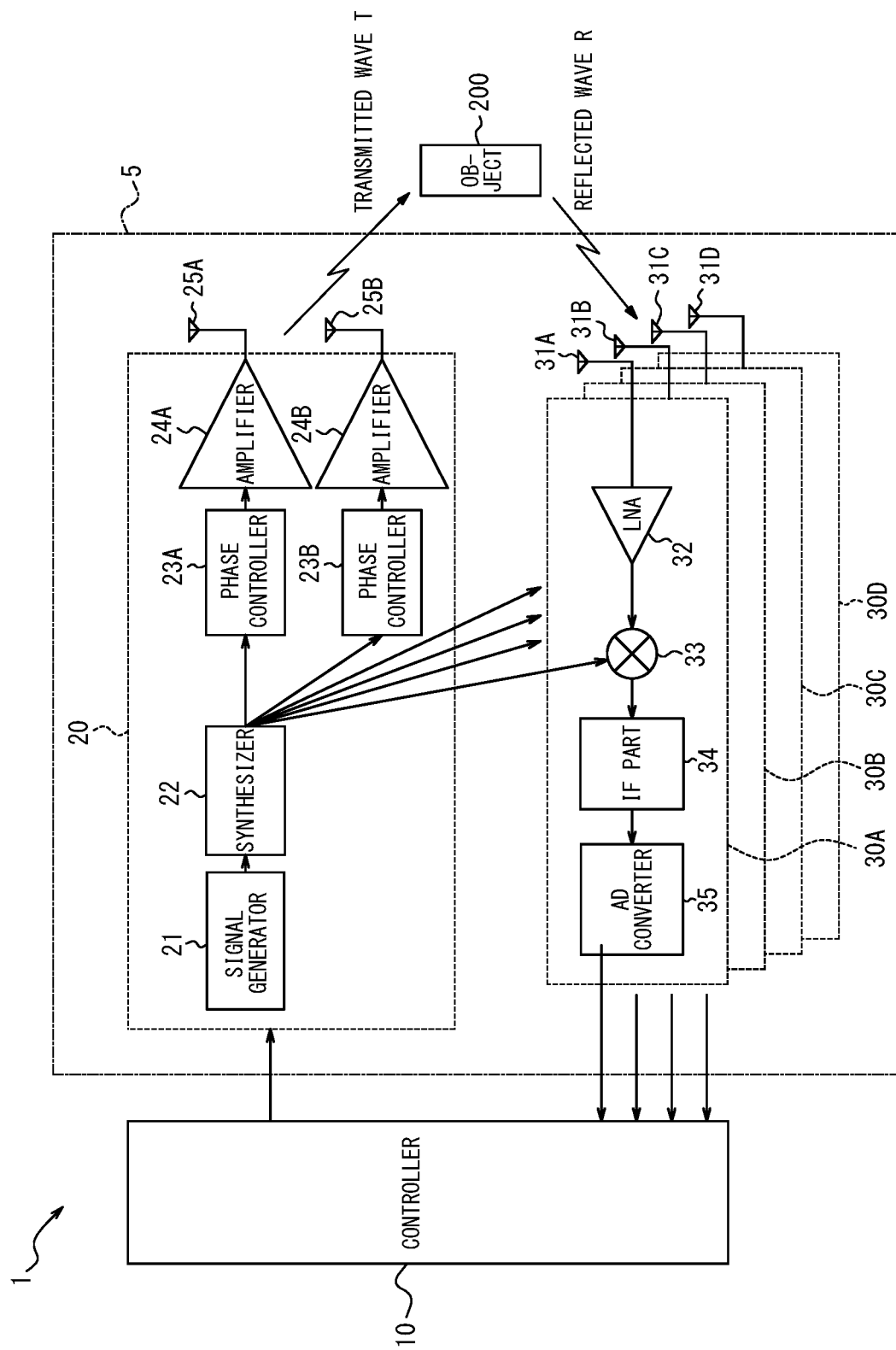
FIG. 2 is a functional block diagram for schematically showing a configuration of an electronic device according to an embodiment.

FIG. 2 is a functional block diagram for schematically showing an example of a configuration of the electronic device 1 according to an embodiment. Hereinafter, an example of a configuration of the electronic device 1 according to an embodiment will be described.

When measuring distance or the like by a millimeter wave radar, a frequency modulated continuous wave radar (hereafter referred to as FMCW radar (Frequency Modulated Continuous Wave radar)) is often used. The FMCW radar sweeps frequencies of radio waves to be transmitted, and thereby transmitted signals are generated. Therefore, for example, in a millimeter wave FMCW radar that uses radio waves in the 79 GHz frequency band, the frequency of the radio waves used will have a frequency bandwidth of 4 GHz, for example, such as 77 GHz to 81 GHz. A radar in the 79 GHz frequency band is characterized by a wider usable frequency bandwidth than other millimeter wave/quasi-millimeter wave radars, such as those in the 24 GHz, 60 GHz, and 76 GHz frequency bands. Hereinafter, such an embodiment will be described. Further, the FMCW radar method used in the present disclosure may include the FCM (Fast-Chirp Modulation) method, which transmits chirp signals with a shorter cycle than usual. The signals generated by a signal generator 21 are not limited to signals of the FMCW method. The signals generated by the signal generator 21 may be signals of various methods other than the FMCW method. The transmitted signal sequence stored in a storage may be different for these various methods. For example, in the case of radar signals of the FMCW method described above, signals whose frequency increases and decreases with each time sample may be used. Because known techniques can be appropriately applied to the various methods described above, more detailed description thereof will be omitted.

As shown in FIG. 2, an electronic device 1 according to an embodiment comprises the sensor 5 and the controller 10. Further, the sensor 5 may include a transmitter 20 and receivers 30A to 30D. As shown in FIG. 2, the electronic device 1 may comprise a plurality of receivers, such as the receivers 30A to 30D. Hereinafter, when the receiver 30A, the receiver 30B, the receiver 30C, and the receiver 30D are not distinguished, they are simply referred to as "receiver 30".

In an example shown in FIG. 2, the sensor 5 and the controller 10 are shown as different functional parts, but the sensor 5 may include all or a part of the controller 10. Further, the member included in the sensor 5 is not limited to the example shown in FIG. 2, and any member among the members shown in FIG. 2 may be removed from the sensor 5. In FIG. 2, for example, the transmitting antenna 25, the receiving antenna 31 and the amplifier 24 may be housed in a single enclosure as the sensor 5. Further, for example, the sensor 5 may include at least one of the transmitting antenna 25 and the receiving antenna 31.

Figure 3:
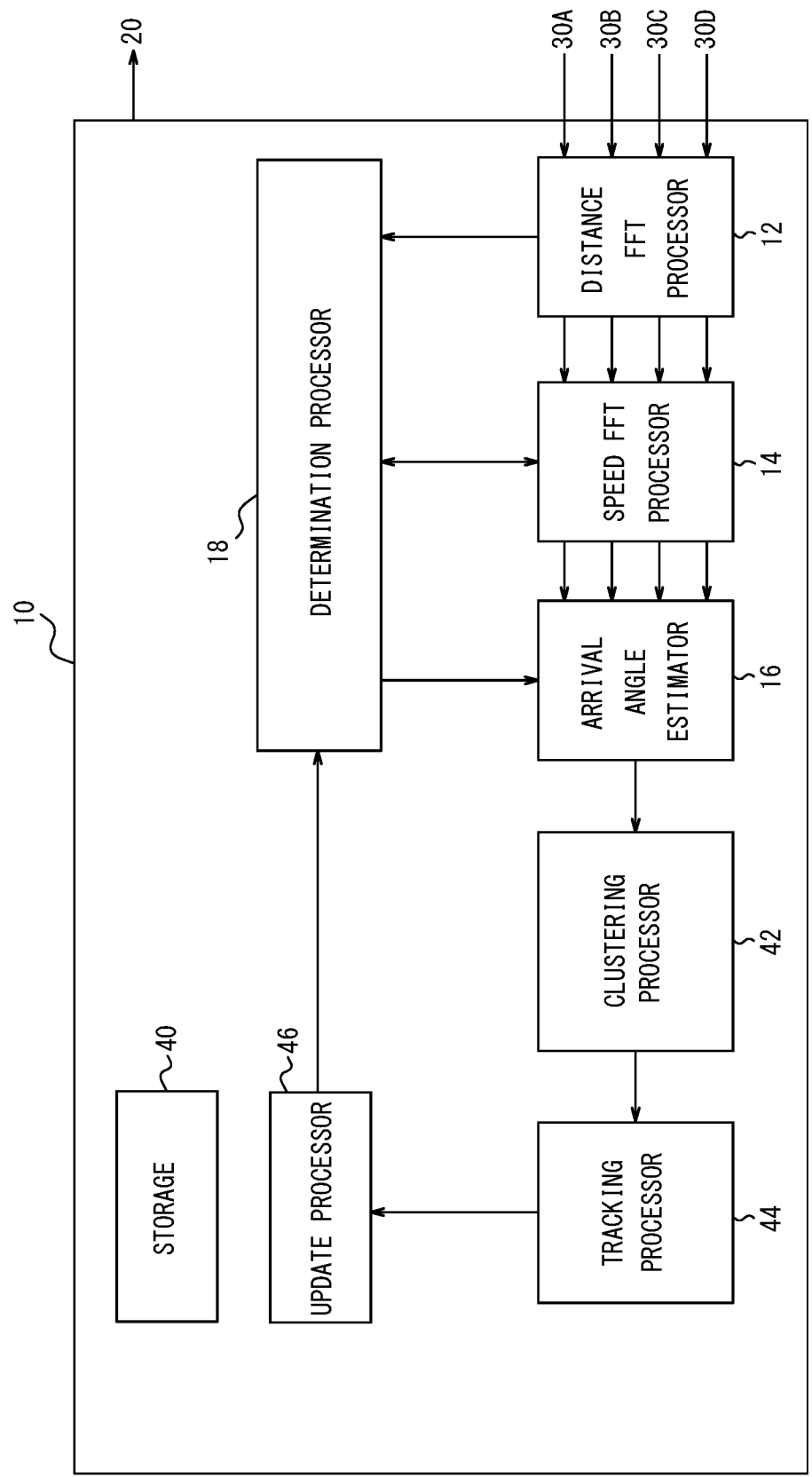
FIG. 3 is a functional block diagram for schematically showing a configuration of a controller of an electronic device according to an embodiment.

The controller 10 shown in FIG. 2 may comprise a distance FFT processor 12, a speed FFT processor 14, an arrival angle estimator 16, a determination processor 18, a storage 40, a clustering processor 42, a tracking processor 44, and an update processor 46, as shown in more detail in FIG. 3. These functional parts included in the controller 10 will be further described below.

As shown in FIG. 2, the transmitter 20 may comprise a signal generator 21, a synthesizer 22, phase controllers 23A and 23B, amplifiers 24A and 24B, and transmitting antennas 25A and 25B. Hereinafter, when the transmitting antenna 25A and the transmitting antenna 25B are not distinguished, they are simply referred to as "transmitting antenna 25". Also, as for other functional parts in the transmitter 20, when a plurality of functional parts of the same type, such as the phase controller 23A and 23B, are not specifically distinguished, these functional parts may be collectively referred to by omitting symbols such as A and B.

As shown in FIG. 2, the receiver 30 may comprise receiving antennas 31A to 31D corresponding to each of the plurality of receivers 30. Hereinafter, when the receiving antenna 31A, the receiving antenna 31B, the receiving antenna 31C and the receiving antenna 31D are not distinguished, they are simply referred to as "receiving antenna 31". Further, as shown in FIG. 2, a plurality of receivers 30 may respectively comprise a LNA 32, a mixer 33, an IF part 34, and an AD converter 35. The receivers 30A to 30D may have the same configuration, respectively. In FIG. 2, as a representative example, a configuration of only the receiver 30A is schematically shown.

As shown in FIG. 2, the sensor 5 may comprise, for example, the transmitting antenna 25 and the receiving antenna 31. Further, as described above, the sensor 5 may also include at least any one of the other functional parts, such as the controller 10 or at least a part of the controller 10, as appropriate.

The controller 10 comprised by the electronic device 1 according to an embodiment can control an operation of the entire electronic device 1 including control of each functional part constituting the electronic device 1. The controller 10 may include at least one processor, such as a CPU (central processing unit), for example, in order to provide control and processing power for performing various functions. The controller 10 may be realized collectively by one processor, by several processors, or by individual processors. The processor may be realized as a single integrated circuit. An integrated circuit is also referred to as an IC (Integrated Circuit). A processor may be realized as a plurality of communicably connected integrated circuits and discrete circuits. A processor may be realized based on various other known techniques. In an embodiment, the controller 10 may be configured, for example, as a CPU and a program executed by the CPU. The controller 10 may appropriately include a memory necessary for an operation of the controller 10.

As shown in FIG. 3, the controller 10 comprises the storage 40. The storage 40 may store programs executed by the controller 10, results of process executed by the controller 10 and the like. Further, the storage 40 may function as a work memory for the controller 10. The storage 40 can be configured by, for example, a semiconductor memory, a magnetic disk or the like, but is not limited to these, and can be an arbitrary storage device. Further, for example, the storage 40 may be a storage medium such as a memory card that is inserted in the electronic device 1 according to the present embodiment. Further, the storage 40 may also be an internal memory of a CPU that is used as the controller 10, as described above.

In the electronic device 1 according to an embodiment, the controller 10 can control at least one of the transmitter 20 and the receiver 30. In this case, the controller 10 may control at least one of the transmitter 20 and the receiver 30 based on various information stored in the storage 40. Further, in the electronic device 1 according to an embodiment, the controller 10 may instruct the signal generator 21 to generate signals, or may control the signal generator 21 to generate signals.

The signal generator 21, shown in FIG. 2, generates the signals (transmitted signals) to be transmitted as transmitted waves T from the transmitting antenna 25 under the control of the controller 10. The signal generator 21 may assign frequencies of transmitted signals, for example based on control by the controller 10 when generating transmitted signals. For example, the signal generator 21 generates signals with predetermined frequencies in a frequency band, such as 77 GHz to 81 GHz, by receiving frequency information from the controller 10. The signal generator 21 may be configured to include a functional part such as a voltage controlled oscillator (VCO).

The signal generator 21 may be configured as a hardware including the function, for example, may be configured by a microcontroller and the like, or for example, may be configured as a combination of a processor such as a CPU and a program executed by the processor. Each functional part described below may also be configured as a hardware including the function, or if possible, for example, by a microcontroller and the like, or for example, as a combination of a processor such as a CPU and a program executed by the processor.

In the electronic device 1 according to an embodiment, the signal generator 21 may generate a transmitted signal (transmitted chirp signal) such as a chirp signal. In particular, the signal generator 21 may generate a signal (linear chirp signal) in which a frequency changes periodically and linearly. For example, the signal generator 21 may generate a chirp signal in which a frequency increases periodically and linearly from 77 GHz to 81 GHz with passage of time. Further, for example, the signal generator 21 may generate a signal in which a frequency periodically repeats linear increase (up chirp) and decrease (down chirp) from 77 GHz to 81 GHz with passage of time. The signal generated by the signal generator 21 may be preset in the controller 10, for example. Further, the signal generated by the signal generator 21 may be stored in advance in a storage 40 or the like, for example. Because chirp signals used in technical fields such as radar are known, more detailed description will be simplified or omitted as appropriate. The signal generated by the signal generator 21 is supplied to the synthesizer 22.

Figure 4:
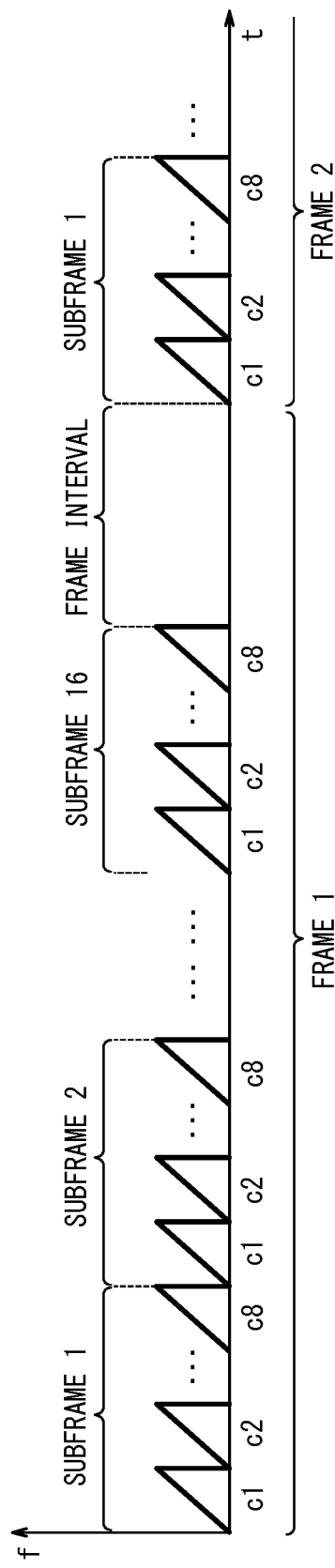
FIG. 4 is a diagram for explaining a configuration of transmitted signals according to an embodiment.

FIG. 4 is a diagram for explaining an example of a chirp signal generated by the signal generator 21.

In FIG. 4, the horizontal axis represents the passage of time, and the vertical axis represents the frequency. In the example shown in FIG. 4, the signal generator 21 generates a linear chirp signal in which a frequency changes periodically and linearly. In FIG. 4, each chirp signal is shown as $c1, c2, \ldots c8$. As shown in FIG. 4, in each chirp signal, a frequency increases linearly with passage of time.

In an example shown in FIG. 4, eight chirp signals such as $c1, c2, \ldots, C8$ are included to form one subframe. That is, the subframe 1 and the subframe 2 shown in FIG. 4 are configured to include eight chirp signals such as $c1, c2, \ldots, C8$, respectively. Further, in an example shown in FIG. 4, 16 subframes such as subframes 1 to 16 are included to form one frame. That is, one frame consists of 16 subframes respectively, such as frame 1 and frame 2 shown in FIG. 4. Further, as shown in FIG. 4, frame intervals of a predetermined length may be included between frames.

In FIG. 4, frame 2 and beyond may have a similar configuration. Further, in FIG. 4, frame 3 and beyond may have a similar configuration. In the electronic device 1 according to an embodiment, the signal generator 21 may generate a transmitted signal as an arbitrary number of frames. Also, in FIG. 4, some chirp signals are shown omitted. Thus, a relationship between frequency and time of a transmitted signal generated by the signal generator 21 may be stored in the storage 40, for example.

Thus, the electronic device 1 according to an embodiment may transmit a transmitted signal consisting of a subframe including a plurality of chirp signals. Also, the electronic device 1 according to an embodiment may transmit a transmitted signal consisting of a frame including a predetermined number of subframes.

Hereinafter, the electronic device 1 will be described as transmitting a transmitted signal with a frame structure as shown in FIG. 4. However, the frame structure as shown in FIG. 4 is an example, and a number of chirp signals included in one subframe is not limited to eight, for example. In an embodiment, the signal generator 21 may generate a sub frame including an arbitrary number of (for example, any plural) chirp signals. Further, the subframe structure as shown in FIG. is also an example. For example, a number of subframes included in one frame is not limited to 16. In an embodiment, the signal generator 21 may generate a frame including an arbitrary number of (for example, any plural) subframes.

The synthesizer 22 shown in FIG. 2 raises a frequency of a signal generated by the signal generator 21 to a frequency in a predetermined frequency band. The synthesizer 22 may raise a frequency of a signal generated by the signal generator 21 to a frequency selected as a frequency of the transmitted wave T to be transmitted from the transmitting antenna 25. The frequency to be selected as the frequency of the transmitted wave T to be transmitted from the transmitting antenna 25 may be set by the controller 10, for example. Further, the frequency selected as the frequency of the transmitted wave T to be transmitted from the transmitting antenna 25 may be stored in the storage 40, for example. The signal whose frequency has been raised by the synthesizer 22 is supplied to the phase controller 23 and the mixer 33. When there are a plurality of receivers 30, the signal whose frequency has been raised by the synthesizer 22 may be supplied to each of the mixer 33 of the plurality of receivers 30.

The phase controller 23 controls a phase of a transmitted signal supplied by the synthesizer 22. Specifically, the phase controller 23 may adjust a phase of a transmitted signal by appropriately advancing or delaying a phase of a signal supplied from the synthesizer 22 based on control by the controller 10, for example. In this case, the phase controller 23 may adjust a phase of each transmitted signal based on path difference of each transmitted wave T to be transmitted from a plurality of transmitting antennas 25. By the phase controller 23 appropriately adjusting the phase of each transmitted signal, the transmitted waves T to be transmitted from the plurality of transmitting antennas 25 intensify each other in a predetermined direction to form a beam (beamforming). In this case, a correlation between a beamforming direction, and phase amount to be controlled of transmitted signals respectively transmitted by a plurality of transmitting antennas 25 may be stored in the storage 40, for example. The transmitted signal whose phase is controlled by the phase controller 23 is supplied to the amplifier 24.

The amplifier 24 amplifies the power (electric power) of the transmitted signal supplied from the phase controller 23, for example, based on control by the controller 10. Because the technique itself for amplifying the power of the transmitted signal is already known, a more detailed description will be omitted. The amplifier 24 is connected to the transmitting antenna 25.

The transmitting antenna 25 outputs (transmits) the transmitted signal amplified by the amplifier 24 as the transmitted wave T. As described above, the sensor may be configured to include a plurality of transmitting antennas, such as the transmitting antenna 25A and the transmitting antenna 25B. Because the transmitting antenna 25 can be configured in the same manner as the transmitting antenna used for known radar technique, a more detailed description will be omitted.

In this way, the electronic device 1 according to an embodiment can transmit a transmitted signal (for example, transmitted chirp signal) as a transmitted wave T from the transmitting antenna 25. Here, at least one of each functional part constituting the electronic device 1 may be housed in one enclosure. In this case, the one enclosure may be constructed so that it cannot be easily opened. For example, the transmitting antenna 25, the receiving antenna 31, and the amplifier 24 are preferably housed in one enclosure, and this enclosure may be constructed so that it cannot be easily opened.

Further, when the sensor 5 is installed on the mobile body 100 such as an automobile, the transmitting antenna 25 may transmit the transmitted wave T to outside the mobile body 100 through a cover member such as a radar cover. In this case, the radar cover may be made of a substance that allows electromagnetic waves to pass through, such as synthetic resin or rubber. This radar cover may be, for example, a housing of the sensor 5. By covering the transmitting antenna 25 with a member such as the radar cover, risks that the transmitting antenna 25 is damaged or malfunctions due to contact with external objects can be reduced. Further, the radar cover and the housing described above may also be referred to as a radome (same as below).

The electronic device 1 shown in FIG. 2 comprises two transmitting antennas 25 such as the transmitting antenna 25A and the transmitting antenna 25B, and transmits the transmitted wave T by these two transmitting antennas 25. Therefore, the electronic device 1 shown in FIG. 2 is also configured to include the two functional parts required to transmit the transmitted wave T from the two transmitting antennas 25, respectively. Specifically, the electronic device 1 is configured to include two phase controllers 23 such as the phase controller 23A and the phase controller 23B. Further, the electronic device 1 shown in FIG. 2 is configured to include two amplifiers 24 such as the amplifier 24A and the amplifier 24B.

The electronic device 1 shown in FIG. 2 comprises two transmitting antennas 25, but the number of transmitting antennas 25 comprised by the electronic device 1 according to an embodiment may be any plurality, for example, three or more. In this case, the electronic device 1 according to an embodiment may comprise the same number of amplifiers 24 as the plurality of transmitting antennas 25. Further, in this case, the electronic device 1 according to an embodiment may comprise the same number of phase controllers 23 as the plurality of transmitting antennas 25.

The receiving antenna 31 receives the reflected wave R. The reflected wave R is the one obtained by reflection of the transmitted wave T on the predetermined object 200. The receiving antenna 31 may be configured to include a plurality of antennas, such as the receiving antenna 31A to the receiving antenna 31D. Because the receiving antenna 31 can be configured in the same manner as the receiving antenna used for the known radar technique, a more detailed description will be omitted. The receiving antenna 31 is connected to the LNA 32. The received signal based on the reflected wave R received by the receiving antenna 31 is supplied to the LNA 32.

The electronic device 1 according to an embodiment can receive the reflected wave R obtained by reflection of the transmitted wave T by a predetermined object 200, transmitted as the transmitted signal (transmitted chirp signal) such as a chirp signal, from a plurality of the receiving antennas 31. Thus, when the transmitted chirp signal is transmitted as the transmitted wave T, the received signal based on the received reflected wave R is referred to as a received chirp signal. That is, the electronic device 1 receives the received signal (for example, the received chirp signal) as the reflected wave R from the receiving antenna 31. Here, at least one of functional parts constituting the electronic device 1 such as the plurality of the receiving antennas 31 may be housed in one enclosure. In this case, the one enclosure may be constructed so that it cannot be easily opened.

Further, when the sensor 5 is installed on the mobile body 100 such as an automobile, the receiving antenna 31 may receive the reflected wave R from outside the mobile body 100 through a cover member such as a radar cover. In this case, the radar cover may be made of a substance that allows electromagnetic waves to pass through, such as synthetic resin or rubber. This radar cover may be, for example, a housing of the sensor 5. By covering the receiving antenna 31 with a member such as the radar cover, risks that the transmitting antenna 25 is damaged or malfunctions due to contact with external objects can be reduced.

Further, the sensor 5 may include, for example, all transmitting antennas 25 and all receiving antennas 31. Further, when the receiving antenna 31 is installed near the transmitting antenna 25, these antennas may be configured to be collectively included in one sensor 5. That is, one sensor 5 may include, for example, at least one transmitting antenna 25 and at least one receiving antenna 31. For example, one sensor 5 may include a plurality of transmitting antennas 25 and a plurality of receiving antennas 31. In such a case, for example, one radar sensor may be covered by a member such as one radar cover.

The LNA 32 amplifies the received signal with low noise based on the reflected wave R received by the receiving antenna 31. The LNA 32 may be used as a low noise amplifier (Low Noise Amplifier), and amplifies the received signal supplied from the receiving antenna 31 with low noise. The received signal amplified by the LNA 32 is supplied to the mixer 33.

The mixer 33 generates a beat signal by mixing (multiplying) the received signal of the RF frequency supplied from the LNA 32 with the transmitted signal supplied from the synthesizer 22. The beat signal mixed by the mixer 33 is supplied to the IF part 34.

The IF part 34 decreases the frequency of the beat signal to an intermediate frequency (IF (Intermediate Frequency) frequency) by performing frequency conversion on the beat signal supplied from the mixer 33. The beat signal whose frequency is decreased by the IF part 34 is supplied to the AD converter 35.

The AD converter 35 digitizes the analog beat signal supplied from the IF part 34. The AD converter may be configured by any analog-to-digital conversion circuit (Analog to Digital Converter (ADC)). As shown in FIG. 3, the beat signal digitized by the AD converter 35 shown in FIG. 2 is supplied to the distance FFT processor 12 of the controller 10. When there are a plurality of receivers 30, each beat signal digitized by the plurality of AD converters 35 may be supplied to the distance FFT processor 12.

The distance FFT processor 12 shown in FIG. 3 can estimate the distance between the mobile body 100 equipped with the electronic device 1 and the object 200, based on the beat signal supplied from the AD converter 35.

The distance FFT processor 12 may include, for example, a processor that performs a fast Fourier transform. In this case, the distance FFT processor 12 may consist of an arbitrary circuit or a chip that performs the fast Fourier Transform (Fast Fourier Transform (FFT)) process. The distance FFT processor 12 may perform Fourier transforms other than the fast Fourier transform. For example, the distance FFT processor 12 may use a discrete Fourier transform or the like.

The distance FFT processor 12 performs a FFT process on the beat signal digitized by the AD converter 35 (hereinafter, appropriately referred to as "first distance FFT process"). For example, the distance FFT processor 12 may perform the FFT process on the complex signal supplied from the AD converter 35. The beat signal digitized by the AD converter 35 can be represented as a time change of signal intensity (electric power). The distance FFT processor 12 performs the FFT process on such beat signals, whereby it can be expressed as the signal intensity (electric power) corresponding to each frequency. When the peak is equal to or higher than a predetermined threshold value in the result obtained by performing the first FFT process, the distance FFT processor 12 may determine that the predetermined object 200 exists at a distance corresponding to the peak. For example, such as the Constant False Alarm Rate (CFAR) detection process, when a peak value equal to or higher than the threshold value is detected in the average power or amplitude of the disturbance signal, a method to determine that there is an object (reflecting object) reflecting transmitted waves is known.

Thus, the electronic device 1 according to an embodiment detects the object 200 reflecting the transmitted wave T based on the transmitted signal, transmitted from the transmitting antenna as the transmitted wave T and the received signal, received from the receiving antenna 31 as the reflected wave R obtained by reflection of the transmitted wave T. Further, the electronic device 1 according to an embodiment may determine that the object 200 has been detected when the peak in the result obtained by performing the FFT process on the beat signal, generated based on the transmitted signal and the received signal, becomes equal to or higher than the predetermined threshold value.

The distance FFT processor 12 can estimate distance to a predetermined object based on one chirp signal (for example, c1 shown in FIG. 4). That is, the electronic device 1 can measure (estimate) the distance L shown in FIG. 1 by performing the first FFT process. Because the technique itself for measuring (estimating) the distance to the predetermined object by performing the FFT process on the beat signal is known, a more detailed description will be simplified or omitted as appropriate. Results of the first FFT process performed by the distance FFT processor 12 may be supplied to the speed FFT processor 14.

The speed FFT processor 14 estimates relative speed between the mobile body 100 equipped with the electronic device 1 and the object 200 based on the beat signal on which the first FFT process has been performed by the distance FFT processor 12. The speed FFT processor 14 may include, for example, a processor for performing the fast Fourier transform. In this case, the speed FFT processor 14 may consist of an arbitrary circuit or a chip, configured to perform the fast Fourier Transform (Fast Fourier Transform (FFT)) process. The speed FFT processor 14 may perform Fourier transforms other than the fast Fourier transform.

The speed FFT processor 14 further performs a FFT process on the beat signal on which the first FFT process has been performed by the distance FFT processor 12 (hereinafter, appropriately referred to as "second FFT process"). For example, the speed FFT processor 14 may perform the FFT process on the complex signal supplied from the distance FFT processor 12. The speed FFT processor 14 can estimate relative speed with a predetermined object based on the subframe of the chirp signal (for example, the subframe 1 shown in FIG. 4). When the first FFT process is performed on the beat signal as described above, a plurality of vectors can be generated. The relative speed with a predetermined object can be estimated by obtaining a phase of the peak in the result obtained by performing the second FFT process on these plurality of vectors. That is, the electronic device 1 can measure (estimate) the relative speed between the mobile body 100 shown in FIG. 1 and the predetermined object 200 by performing the second FFT process. Because the technique itself for measuring (estimating) the relative speed with the predetermined object by performing the speed FFT process on the result obtained by performing the distance FFT process is known, more detailed description will be simplified or omitted as appropriate. The result obtained by performing the second FFT process by the speed FFT processor 14 may be supplied to the arrival angle estimator 16.

The arrival angle estimator 16 estimates the direction in which the reflected wave R arrives from the predetermined object 200 based on the result obtained by the FFT process performed by the speed FFT processor 14. The arrival angle estimator 16 can estimate the direction in which the reflected wave R arrives by receiving the reflected wave R from the plurality of receiving antennas 31. For example, it is assumed that the plurality of receiving antennas 31 are arranged at predetermined intervals. In this case, the transmitted wave T transmitted from the transmitting antenna 25 is reflected by the predetermined object 200 and becomes the reflected wave R, and each of the plurality of receiving antennas 31 arranged at predetermined intervals respectively receives the reflected wave R. Then, the arrival angle estimator 16 can estimate the direction in which the reflected wave R arrives at the receiving antenna 31 based on the phase of the reflected wave R respectively received by each of the plurality of receiving antennas 31 and the path difference of each of the reflected waves R. That is, the electronic device 1 can measure (estimate) the arrival angle θ shown in FIG. 1 based on the result obtained by performing the second FFT process.

Various techniques for estimating the direction in which the reflected wave R arrives based on the result obtained by performing the speed FFT process have been proposed. For example, algorithms for estimating the direction in which the reflected wave arrives, such as MUSIC (Multiple Signal Classification), ESPRIT (Estimation of Signal Parameters via Rotational Invariance Technique) and the like are known. Therefore, more detailed description for known techniques will be simplified or omitted as appropriate. The information (angle information) of the arrival angle θ estimated by the arrival angle estimator 16 may be output to the clustering processor 42. Further, the information output from the distance FFT processor 12 and the information output from the speed FFT processor 14 may also be output to the clustering processor 42.

Further, the information of the arrival angle θ (angle information) estimated by the arrival angle estimator 16 may be output from the controller 10 to the ECU (Electronic Control Unit) or the like, for example. In this case, when the mobile body 100 is an automobile, communication may be performed using a communication interface such as CAN (Controller Area Network).

The determination processor 18 performs a process for determining whether each value used for the arithmetic processing is equal to or higher than a predetermined threshold value. For example, the determination processor 18 may determine whether the peaks in the results obtained by the process performed by the distance FFT processor 12 and the speed FFT processor 14 are equal to or higher than a predetermined threshold value, respectively.

For example, the determination processor 18 may determine whether the peak in the result obtained by performing the first FFT process by the distance FFT processor 12 is equal to or higher than the first threshold value. That is, the determination processor 18 may determine whether the peak in the result obtained by performing the first FFT process on the beat signal generated based on the transmitted signal and the received signal becomes equal to or higher than the first threshold value. To set the first threshold value will be described further below. In this way, if the peak in the result obtained by performing the first FFT process on the beat signal is determined to be equal to or higher than the first threshold value, the beat signal may be counted as the "first sample".

Further, for example, the determination processor 18 may determine whether the peak in the result obtained by the second FFT process performed by the speed FFT processor 14 becomes equal to or higher than the second threshold value. That is, the determination processor 18 may determine whether the peak in the result obtained by performing the second FFT process on the above-mentioned first sample becomes equal to or higher than the second threshold value. To set the second threshold value will be described later. In this way, when it is determined that the peak in the result obtained by performing the second FFT process on the first sample is equal to or higher than the second threshold value, the first sample may be counted as the "second sample".

As described above, the arrival angle estimator 16 estimates the direction in which the reflected wave R arrives from the predetermined object 200 based on the result obtained by the FFT process performed by the speed FFT processor 14. Further, the speed FFT processor 14 performs the second FFT process on the beat signal on which the first FFT process has been performed by the distance FFT processor 12. In this case, the distance FFT processor 12 may generate the first sample, according to the determination process by the determination processor 18, based on the result obtained by performing the first FFT process on the beat signal generated based on the transmitted and received signals. Further, the speed FFT processor 14 may generate the second sample, according to the determination process by the determination processor 18, based on the result obtained by performing the second FFT process on the first sample. Then, the arrival angle estimator 16 may estimate the arrival direction (arrival angle θ) of the reflected wave R based on the generated second sample. For example, the electronic device 1 may estimate the arrival direction (arrival angle θ) of the reflected wave R based on a covariance matrix obtained from the second sample.

The electronic device 1 shown in FIG. 2 comprises two transmitting antennas 25 and four receiving antennas 31. Thus, by comprising a plurality of transmitting antennas 25 and a plurality of receiving antennas 31, the electronic device 1 may use these antennas as a virtual antenna array of, for example, eight antennas. In this way, the electronic device 1 may transmit and receive the reflected wave R with the 16 subframes shown in FIG. 4 by using eight virtual antennas.

The clustering processor 42 performs a clustering process based on the output from at least one of the distance FFT processor 12, the speed FFT processor 14, and the arrival angle estimator 16. As an algorithm used for clustering data, for example, DBSCAN (Density-based spatial clustering of applications with noise) is known. The information clustered by the clustering processor 42 may be output to the tracking processor 44.

The tracking processor 44 performs a tracking process based on the output from the clustering processor 42. As a method of tracking, a method such as a Kalman (Kalman) filter is known. The result obtained by the tracking process performed by the tracking processor 44 is supplied to the update processor 46.

The information of the results obtained by tracking process performed by the tracking processor 44 may be output from the controller 10 to the ECU (Electronic Control Unit), for example. In this case, when the mobile body 100 is an automobile, communication may be performed using a communication interface such as CAN (Controller Area Network).

The update processor 46 updates each value related to the determination process to be performed by the determination processor 18, based on the information of the result output from the tracking processor 44. As described above, the determination processor 18 determines whether the peak in the result obtained by the FFT process performed by the distance FFT processor 12 and the speed FFT processor 14 is equal to or higher than a predetermined threshold value. The update processor 46 may update each value related to such determination process. The process of updating each value related to the determination process performed by the determination processor 18, by the update processor 46 is described further below, along with the threshold values described above.

FIGS. 5 to 10 are diagrams for explaining examples of operations of the electronic device 1 according to an embodiment. Hereinafter, an example of the operation of the electronic device 1 according to an embodiment will be described. Hereinafter, an example in which the electronic device 1 is configured as an FMCW radar of the millimeter wave method will be described.

Figure 5:
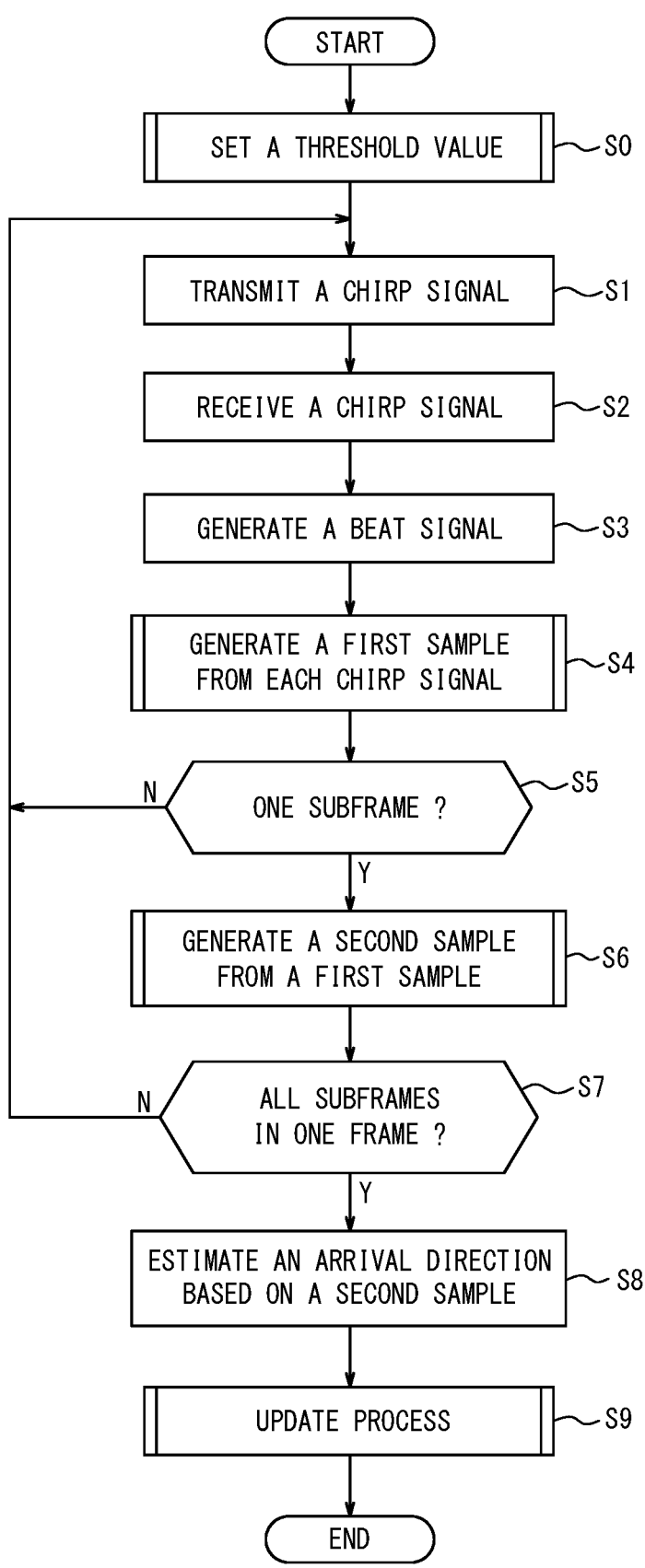
FIG. 5 is a flowchart for explaining an operation of an electronic device according to an embodiment.

FIG. 5 is a flowchart for explaining an operation of the electronic device 1 according to an embodiment. The operation shown in FIG. 5 may be started, for example, when the electronic device 1 detects a predetermined object 200 existing around the mobile body 100.

When the operation shown in FIG. 5 starts, the controller 10 of the electronic device 1 firstly sets a threshold value to be used when the determination processor 18 performs the determination process (step S0).

FIG. 6 is a diagram for showing an example of a threshold value used for the determination processor 18 to perform determination process. Each threshold value shown in FIG. 6 may be stored in, for example, the determination processor 18 or the storage 40. As shown in FIG. 6, the determination processor 18 can set each threshold value for performing the determination process. In FIG. 6, a threshold value of 9 dB to 15 dB is shown as an example of the threshold value Sth for performing the determination process. As described above, the threshold value Sth may be the first threshold value that is determined to be larger or smaller than the peak in the result obtained by the first FFT process performed by the distance FFT processor 12. Further, as described above, the threshold value Sth may be the second threshold value that is determined to be larger or smaller than the peak in the result obtained by the second FFT process performed by the speed FFT processor 14. That is, the threshold value Sth shown in FIG. 6 may be at least one of the first threshold value and the second threshold value described in detail. Further, the first threshold value and the second threshold value may be the same as or different from the threshold value Sth shown in FIG. 6.

As shown in FIG. 6, each value of the threshold value Sth corresponds to an object detection probability, respectively. This object detection probability is a value that is associated with the threshold Sth based on the determination of whether an object has been detected in the determination process by the determination processor 18 when the threshold Sth is used. For example, the object detection probability P (15) shown in FIG. 6 indicates the object detection probability [%] when the threshold value Sth is set to dB. As shown in FIG. 6, this object detection probability may be determined according to whether the object detection was successful or unsuccessful when the threshold Sth was used. For example, the success counts OK (15) shown in FIG. 6 indicates the number of times an object was determined to be detected when the threshold value Sth is 15 dB. Similarly, the failure counts NG (15) shown in FIG. 6 indicates the number of times an object was determined not to be detected when the threshold value Sth is set to 15 dB.

In step S0, the controller 10 may preferentially select the one with the highest object detection probability associated with each threshold value candidate when setting the threshold value Sth from among a plurality of threshold value candidates shown in FIG. 6 as the first and second threshold values. That is, in the electronic device 1 according to an embodiment, the predetermined threshold value Sth may be preferentially selected from among a plurality of threshold value candidates with a higher object detection probability P [%] associated with each of the plurality of threshold value candidates. Therefore, the determination processor 18 may use a scheduler that preferentially selects a threshold value Sth with a higher object detection probability, for example. The process of associating the object detection probability with each threshold value Sth will be described further below.

When the threshold value is set in step S0, the controller 10 controls the transmitter 20 to transmit the chirp signal from the transmitting antenna 25 (step S1). Specifically, the controller 10 instructs the signal generator 21 to generate transmitted signals (chirp signals). The controller 10 then controls so that the chirp signals are transmitted as transmitted waves T from the transmitting antenna 25 through the synthesizer 22, the phase controller 23, and the amplifier 24.

When the chirp signal is transmitted in step S1, the controller 10 controls the receiver 30 to receive the chirp signal from the receiving antenna 31 (step S2). When the chirp signal is received in step S2, the controller 10 controls the receiver 30 to generate a beat signal by multiplying the transmitted chirp signal and the received chirp signal (step S3). Specifically, the controller 10 controls so that the chirp signal received from the receiving antenna 31 is amplified by the LNA 32 and multiplied with the transmitted chirp signal by the mixer 33. The process from step S1 to step S3 may be performed, for example, by adopting a known millimeter wave FMCW radar technique.

When the beat signal is generated in step S3, the controller 10 generates the first sample described above from each generated chirp signal (step S4).

Figure 7:
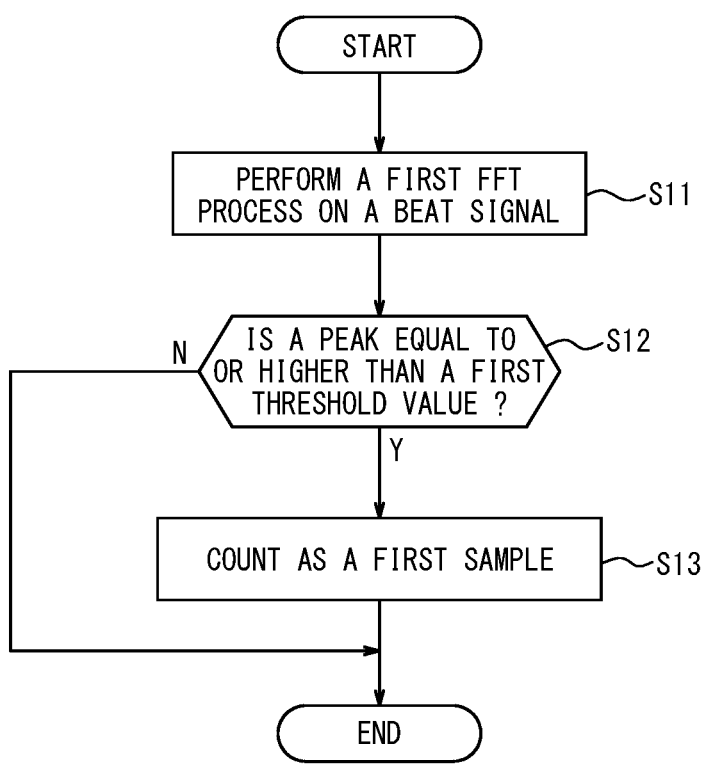
FIG. 7 is a flowchart for explaining an operation of an electronic device according to an embodiment.

Hereinafter, the process of step S4 will be described further below. FIG. 7 is a flowchart for explaining the process of step S4 in FIG. 5 in more detail.

When the process of step S4 shown in FIG. 5 starts, the distance FFT processor 12 performs the first FFT process on the beat signal generated in step S3 as shown in FIG. 7 (step S11). As described above, when the process of step S11 is performed, the signal intensity (electric power) corresponding to each frequency is obtained. In step S11, the distance FFT processor 12 may perform the first FFT process on the digital beat signal supplied from the AD converter 35.

When the first FFT process is performed on the beat signal in step S11, the determination processor 18 determines whether the peak in the result obtained by performing the first FFT process on the generated beat signal is equal to or higher than the first threshold value (step S12). Here, as described above, the first threshold value is the threshold value Sth set to be used when the determination processor 18 performs determination process in step S0.

Figure 8:
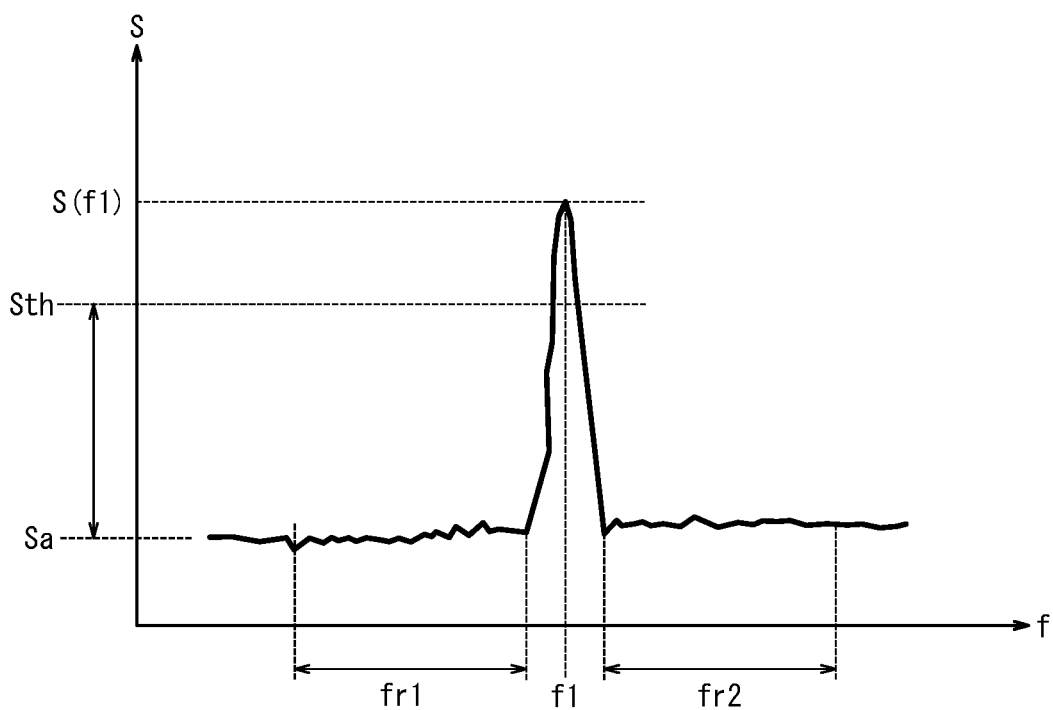
FIG. 8 is a diagram for explaining a threshold value set in an embodiment.

Here, to set the first threshold value will be described. FIG. 8 is a diagram for explaining an example of setting the first threshold value.

FIG. 8 is a diagram for showing an example of the result obtained by performing the first FFT process on the beat signal in step S11, for example. In FIG. 8, the horizontal axis represents the frequency f, and the vertical axis represents the signal intensity (electric power) S. In the example shown in FIG. 8, when the frequency is in the region of fr1 and the frequency is in the region of fr2, the signal intensity shows a value close to Sa. Further, in the example shown in FIG. 8, when the frequency is f1, the signal intensity shows the peak value S (f1).

In an embodiment, the determination processor sets the power threshold value Sth so that, for example, the peak value S (f1) of the electric power can be detected. Here, the threshold value Sth may be set based on, for example, the average value of the electric power in the region fr1 and/or the region fr2 other than the peripheral region including the frequency f1 when the electric power reaches the peak value S (f1). For example, in FIG. 8, when the frequencies are in the region fr1 and/or the region fr2, the average signal intensity shows a value close to Sa. Therefore, for example, the average value of the electric power in the region fr1 and/or the region fr2 other than the peripheral region including the frequency f1 when the electric power reaches the peak value S (f1) shall be Sa. In this case, by setting the average power value Sa plus a predetermined value as the power threshold value Sth, the electronic device 1 can detect an object such as a predetermined object 200. Further, when setting the power threshold value Sth, the guard band may be excluded in the peripheral region including the frequency f1 when the electric power reaches the peak value S (f1).

In this way, by setting the power threshold value Sth, the determination processor 18 can determine whether the peak in the result obtained by performing the first FFT process on the beat signal is equal to or higher than the first threshold value.

In step S12 shown in FIG. 7, it is determined whether the peak in the result obtained by performing the first FFT process on the beat signal is equal to or higher than the first threshold value. When it is determined in step S12 that the peak is equal to or higher than the first threshold value, the determination processor 18 performs the operation in step S13 and ends the process shown in FIG. 7. On the other hand, when it is determined in step S12 that the peak is less than the first threshold value, the determination processor 18 ends the process shown in FIG. 7 without performing the operation in step S13.

In step S13, the determination processor 18 counts the beat signal on which it is determined that the peak in the results obtained by performing the first FFT process is equal to or higher than the first threshold value, as the first sample. For example, in step S13, the determination processor 18 may store the first sample in the storage 40, the internal memory of the controller 10 or the like, for later process. In step S11, the beat signal on which the first FFT process is performed may be a unit of one chirp signal (for example, el shown in FIG. 3), for example. Therefore, what is counted as the first sample in step S13 may be a unit of one chirp signal.

As described above, the distance FFT processor 12 may generate a first sample from one chirp signal in step S4 shown in FIG. 5.

When the first sample is generated in step S4, the determination processor 18 determines whether the process of step S4 has been performed on all the chirp signals included in one subframe (step S5). In step S5, the determination processor 18 may determine whether the process of step S4 has been performed on eight chirp signals (for example, c1 to c8 shown in FIG. 3) included in one subframe (for example, subframe 1 shown in FIG. 3), for example.

If it is determined in step S5 that the process of step S4 has not yet been performed on some of the chirp signals included in one subframe, the controller 10 returns to step S1 and continues the process.

On the other hand, when it is determined in step S5 that the process of step S4 has been performed on all of the chirp signals in one subframe, the controller 10 performs the process in step S6. The case of proceeding to step S6 means that, for example, the first FFT process has been performed on all of eight chirp signals (c1 to c8) included in the subframe 1 shown in FIG. 3. Then, when proceeding to step S6, among the above-mentioned eight chirp signals (c1 to c8), the one on which the peak in the result obtained by performing the first FFT process is equal to or higher than the first threshold value is counted as the first sample.

When it is determined in step S5 that the process of step S4 has been performed on all the chirp signals included in one subframe, the controller 10 generates the above-mentioned second sample from the generated first sample. (Step S6).

Figure 9:
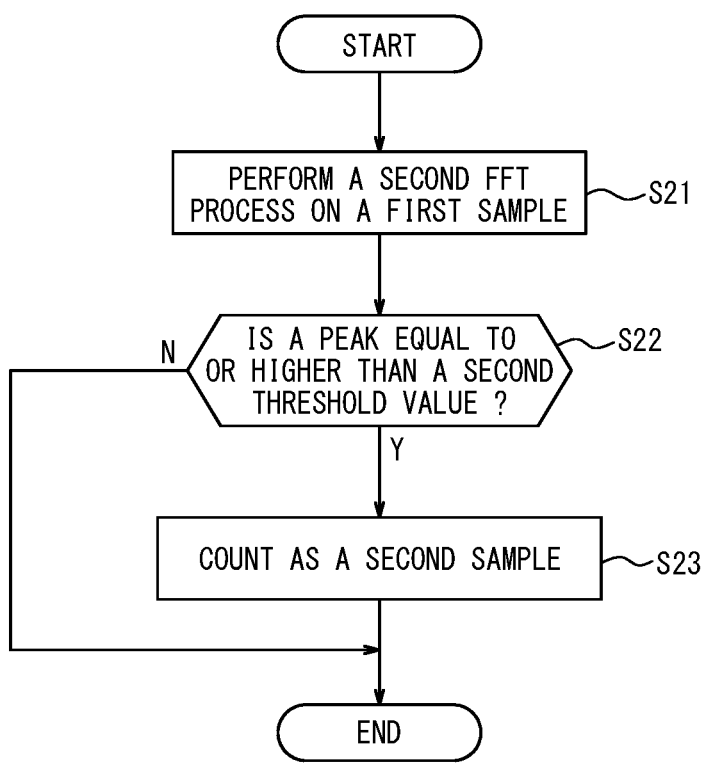
FIG. 9 is a flowchart for explaining an operation of an electronic device according to an embodiment.

Hereinafter, the process of step S6 will be further described. FIG. 9 is a flowchart for explaining the process of step S6 in FIG. 5 in more detail.

When the process of step S6 shown in FIG. 5 starts, the speed FFT processor 14 performs a second FFT process on the first sample generated in step S4 as shown in FIG. 9 (step S21). In step S21, the speed FFT processor 14 may perform the second FFT process on the result obtained by the first FFT process performed by the distance FFT processor 12.

After the second FFT process is performed in step S21, the determination processor 18 determines whether the peak in the result obtained by performing the second FFT process on the first samples on which the second FFT process has been performed becomes equal to or higher than the second threshold value (step S22). Here, the second threshold value is the threshold value Sth set to be used when the determination processor 18 performs the determination process in step S0 as described above.

Here, the second threshold value can be set in the same manner as the first threshold. That is, in an embodiment, the determination processor 18 may set the power threshold value S'th so that, for example, the peak value S'(f1) of the electric power can be detected. By setting the power threshold value S'th in the same manner as the first threshold value, the determination processor 18 can determine whether the peak in the result obtained by performing the second FFT process on the first sample is equal to or higher than the second threshold value.

In step S22 shown in FIG. 9, it is determined whether the peak in the result obtained by performing the second FFT process on the first sample is equal to or higher than the second threshold value. When it is determined in step S22 that the peak is equal to or higher than the second threshold value, the determination processor 18 performs the operation in step S23 and ends the process shown in FIG. 9. On the other hand, when it is determined in step S22 that the peak is less than the second threshold value, the determination processor 18 ends the process shown in FIG. 9 without performing the operation in step S23.

In step S23, the determination processor 18 counts the first sample for which it is determined that the peak in the result obtained by performing the second FFT process is equal to or higher than the second threshold value as the second sample. For example, in step S23, the determination processor 18 may store the second sample in the storage 40, the internal memory of the controller 10 or the like for later processes. In step S21, the first sample on which the second FFT process is performed may be a unit of chirp signals (for example, c1 to c8 shown in FIG. 3) included in one subframe, for example. Therefore, what is counted as the second sample in step S23 may be a unit of chirp signals included in one subframe.

As described above, the speed FFT processor 14 generates the second sample from the chirp signals included in one subframe in step S6 shown in FIG.

When the second sample is generated in step S6, the determination processor 18 determines whether the process of step S6 has been performed on the chirp signals of all the subframes included in one frame (step S7). In step S7, the determination processor 18 may determine whether the process of step S6 has been performed on all of the chirp signals of the 16 subframes (subframe 1 to subframe 16 shown in FIG. 3) included in one frame (for example, frame 1 shown in FIG. 3).

When it is determined in step S7 that some of the chirp signals included in one frame have not yet been processed in step S6, the controller 10 returns to step S1 and continues the process.

On the other hand, when it is determined in step S7 that the process of step S6 has been performed on the chirp signals of all the subframes included in one frame, the controller 10 performs the process of step S8. The case of proceeding to step S8 means that, for example, the second FFT process has been performed on the 16 subframes (subframes 1 to 16) included in the frame 1 shown in FIG. 3. Then, when proceeding to step S8, the first sample included in the above-mentioned 16 subframes in which the peak in the result obtained by performing the second FFT process is equal to or higher than the second threshold value is counted as the second sample.

In step S8, the arrival angle estimator 16 estimates the arrival direction (arrival angle θ) of the reflected wave R based on the generated second sample (step S8). In step S8, the arrival angle estimator 16 may estimate the arrival direction of the reflected wave R based on, for example, the covariance matrix obtained from the second sample. That is, in step S8, the arrival angle estimator 16 may estimate the arrival direction (arrival angle θ) of the reflected wave R reflected by a predetermined object 200 from the complex signals of the peaks of a plurality of antennas that satisfy the speed threshold (second threshold) value. For example, the covariance matrix for estimating the arrival direction (angle of arrival θ) may be obtained using the complex signal of the peak of the second sample in which the peak in the result obtained by performing the second FFT process on one frame (16 subframes) of the transmitted signal described above is equal to or higher than the second threshold value.

When the arrival direction (arrival angle θ) is estimated in step 8, the controller 10 performs the update process (step S9).

Here, the update process according to an embodiment will be described. FIG. 10 is a flowchart for explaining the process of step S9 in FIG. 5 in more detail.

When the process of step S9 shown in FIG. 5 starts, the clustering processor 42 performs a data clustering process as shown in FIG. 10 (step S31). In step S31, the clustering processor 42 may perform the clustering process based on the information of the distance to the predetermined object 200, the information of the relative speed with the object 200, and the information of the arrival direction (arrival angle θ) of the reflected wave R reflected by the predetermined object 200. In step S31, as described above, the clustering processor 42 may perform the clustering process using an algorithm such as DBSCAN.

When the clustering process is performed in step S31, the tracking processor 44 performs the tracking process based on the result obtained by performing the clustering process (step S32). In step S32, the tracking processor 44 may perform the tracking process between frames, for example by Kalman filter, as described above.

When the tracking process is performed in step S32, the tracking processor 44 determines whether a cluster of a predetermined object 200 can be detected as a result of the tracking process (step S33). In step S33, if the tracking processor 44 can detect the cluster of the object 200, it determines that the detection is successful (step S34). Specifically, the tracking processor 44 estimates the result of the $n+1^{th}$ frame from the clustering result up to the $n^{th}$ frame and the estimation result of the Kalman filter of the $n^{th}$ frame by calculating the Kalman filter. The tracking processor 44 uses this estimation result when the $n+1^{th}$ frame is not detected. The result determined to be detection success in step S34 may be supplied to the update processor 46. On the other hand, in step S33, if the tracking processor 44 cannot detect the cluster of the object 200, it determines that the detection has failed (step S35). The information of the result determined to be detection failure in step S35 may be supplied to the update processor 46.

When the information of the result of the detection success or failure is supplied to step S34 or step S35, the update processor 46 updates the object detection probability shown in FIG. 6 (step S36). For example, when the threshold value Sth is set to 10 dB in step S0 and the cluster detection is successful in step S33 (step S34), the update processor 46 adds 1 to the number of success counts OK (10) shown in FIG. 6, in step S36. Further, when the threshold value Sth is set to 12 dB in step S0 and the cluster detection fails in step S33 (step S35), the update processor 46 adds 1 to the number of failure counts NG (12) shown in FIG. 6, in step S36. Then, the update processor 46 updates the object detection probability at the threshold value based on the increment of success or failure at each threshold value.

Hereinafter, for example, when 14 [dB] is selected as the threshold value Sth and the detection of the object 200 is successful, the process of updating the object detection probability corresponding to the threshold value Sth (14 dB) will be described as a specific example.

The probability that the detection of the object 200 is successful is described as P (OK), and the conditional probability that the detection of the object 200 is successful when 14 [dB] is selected as the threshold value Sth is described as P (OK|14). In this case, the conditional probability P (OK|14) can be expressed by Bayes' theorem as in the following equation (1).

$$P(OK \mid 14) = \frac{\frac{OK(14)}{(OK(14) + NG(14))} \times P(14)}{\sum_{X=9dB}^{15dB} \frac{OK(X)}{(OK(X) + NG(X))} \times P(X)} \quad \text{(Equation (1))}$$

The value of the conditional probability P (OK|14) obtained as described above is updated as the value of the object detection probability P (14) when the threshold value Sth is 14 [dB]. That is, the next determination on whether to select 14 [dB] as the threshold Sth is done based on this object detection probability P (14).

Similarly, the conditional probability P (OK|X) in which the detection of the object 200 is successful when X [dB] is selected as the threshold value Sth can be obtained in the same manner. In this way, the corresponding object detection probability P (X) is updated for each threshold value Sth. When updating the object detection probability as such a conditional probability, if the object detection probability at any threshold Sth is updated, the object detection probability at the other threshold Sth can also be changed by changing the population of success counts or failure counts.

Thus, in the electronic device 1 of an embodiment, the object detection probability associated with each of the plurality of threshold candidates may be updated based on the determination of whether the object was successfully detected when the predetermined threshold Sth was set.

When the object detection probability is updated in step S36, the process shown in FIG. 10 ends, and the process in step S9 shown in FIG. 5 also ends. When the process shown in FIG. 5 ends, the electronic device 1 may restart the process shown in FIG. 5. When the process shown in FIG. 5 starts again, the controller 10 sets a threshold value to be used by the determination processor 18 when performing the determination process. In step S0, the controller 10 sets the above-mentioned first threshold value and second threshold value based on the object detection probability updated in step S9 among the respective values shown in FIG. 6. Also here, the determination processor 18 may use, for example, a scheduler that preferentially selects the threshold value Sth with a higher object detection probability. Using the threshold value Sth selected in this way, the electronic device 1 may calculate the distance and speed of the peaks that are equal to or higher than the threshold value by comparing the peaks in the results obtained by performing the FFT process with the threshold value, in the same manner as the operation described above. By such an operation, the electronic device 1 can dynamically update the threshold value to be compared with the peak in the result obtained by performing the FFT process.

As described above, the electronic device 1 according to the embodiment sets a predetermined threshold value Sth based on the object detection probability. Here, as shown in FIG. 6, the predetermined threshold value Sth may be selected from a plurality of threshold value candidates, and the object detection probability may be associated with the plurality of threshold value candidates, respectively. Further, the predetermined threshold value Sth may be preferentially selected from among the plurality of threshold value candidates with a higher object detection probability P [%] respectively associated with each of the plurality of threshold value candidates. Further, in the electronic device 1 according to an embodiment, when the object detection probabilities respectively associated with the plurality of threshold candidates are updated, a predetermined threshold Sth may be set based on the updated object detection probabilities.

Further, the electronic device 1 according to an embodiment may determine whether the detection of the object 200 is successful based on the result obtained by performing the clustering process on the result obtained by performing the fast Fourier transform process on the beat signal described above. Here, the electronic device 1 according to an embodiment may determine that the detection of the object 200 is successful when it is determined that the object 200 exists as a result obtained by performing the clustering process. On the other hand, the electronic device 1 according to an embodiment may determine that the detection of the object 200 has not been successful when it is estimated that the object 200 exists as a result obtained by performing the tracking process on the result obtained by performing the clustering process.

According to the electronic device 1 of an embodiment, when setting a threshold value of, for example, a constant false alarm rate (CFAR) for determining that an object has been detected, it is possible to preferentially select the threshold value with a higher object detection probability. Further, according to the electronic device 1 of an embodiment, it is possible to update, for example, a constant false alarm rate corresponding to the above-mentioned threshold value based on the results obtained by performing the clustering process and the tracking process when detecting a predetermined object.

Generally, in a technique such as radar, a disturbance signal depends on a surrounding object. Therefore, if the threshold value used for detecting the object is fixed, it is assumed that the object cannot be detected. An electronic device according to an embodiment can be dynamically controlled so that the threshold value with the highest statistical probability of successful detection is set. Therefore, according to an electronic device of an embodiment, it is possible to respond to changes in the surrounding environment and reduce the probability that the object will not be detected.

As described above, according to the electronic device 1 of an embodiment, the object reflecting transmitted waves can be detected with high accuracy.

The present disclosure has been described based on the drawings and examples, but it should be noted that those skilled in the art will find it easy to make various variations or modifications based on the present disclosure. Therefore, it should be noted that these variations or modifications are included in the scope of this disclosure. For example, the functions included in each functional part and the like can be rearranged in a logically consistent manner. A plurality of functional parts and the like may be combined into one or divided. Each of the embodiments according to the present disclosure described above is not limited to faithful implementation of each of the described embodiments, but may be implemented by combining or omitting some of the features as appropriate. That is, the contents of the present disclosure can be subjected to various variations and modifications based on the present disclosure by those skilled in the art. Therefore, these variations and modifications are included in the scope of this disclosure. For example, in each embodiment, each functional part, each means, each step and the like can be added to other embodiments in a logically consistent manner, or can be replaced with each functional part, each means, each step and the like of other embodiments. Further, in each embodiment, the plurality of each functional part, each means, each step and the like can be combined into one or divided. Each of the embodiments of the present disclosure described above is not limited to faithful implementation of each of the described embodiments, and may be implemented by combining or omitting some of the features as appropriate.

In the embodiment described above, an example of updating the object detection probability associated with each of the plurality of candidates of the threshold value Sth shown in FIG. 6 has been described. Further, in the embodiment described above, an example of dynamically changing the first threshold value and/or the second threshold value based on the object detection probability updated in this way has been described. However, in the electronic device 1 according to an embodiment, it is not necessary to dynamically change the first threshold value and/or the second threshold value based on the object detection probability updated as described above. For example, in the electronic device 1 according to an embodiment, the threshold value with the highest object detection probability P [%] associated with each of the plurality of threshold value candidates may be selected from among the plurality of threshold value candidates, and the threshold value may be fixed and used. Further, in the electronic device 1 according to an embodiment, after the first threshold value and/or the second threshold value is set once, the set threshold value may be changed based on a predetermined condition such as a change in an environment. Also in this case, in the electronic device 1 according to an embodiment, the threshold value with the highest object detection probability P [%] associated with each of the plurality of threshold value candidates may be selected from among the plurality of threshold value candidates.

Further, the plurality of threshold candidates as shown in FIG. 6 can update the object detection probability associated with the threshold value by, for example, selecting a threshold value other than the threshold value with the highest object detection probability P [%]. Therefore, in the electronic device 1 according to an embodiment, for example, under a predetermined condition such as during a test driving, the threshold value with the highest object detection probability P [%] associated with each of the plurality of threshold value candidates may not be intentionally selected. For example, the electronic device 1 of an embodiment may use the threshold value with the second highest object detection probability P [%] associated with each of the plurality of threshold value candidates, the third highest threshold value, or the lowest threshold value. That is, under a predetermined condition, the electronic device 1 according to an embodiment may select the predetermined threshold value described above, from among a plurality of threshold value candidates, other than a threshold value with a highest object detection probability associated with each of the plurality of threshold candidates.

The embodiment described above is not limited to implementation only as an electronic device 1. For example, the embodiment described above may be implemented as a method for controlling devices such as the electronic device 1. Furthermore, for example, the embodiments described above may be implemented as a control program for devices such as the electronic device 1. In addition, the contents of the present disclosure may be variated and modified by those skilled in the art based on the present disclosure. Therefore, these variations or modifications are included in the scope of this disclosure. For example, in each embodiment, each functional part, each means, each step and the like can be added to other embodiments in a logically consistent manner, or can be replaced with each functional part, each means, each step and the like of other embodiments. Further, in each embodiment, the plurality of each functional part, each means, each step and the like can be combined into one or divided. Each of the embodiments of the present disclosure described above is not limited to faithful implementation of each of the described embodiments, and may be implemented by combining or omitting some of the features as appropriate.

As the minimum configuration, the electronic device 1 according to an embodiment may comprise, for example, only the controller 10 or only a part of the elements constituting the controller 10. On the other hand, in addition to the controller 10, the electronic device 1 according to an embodiment may comprise at least any one of the signal generator 21, the synthesizer 22, the phase controller 23, the amplifier 24, and the transmitting antenna 25, as shown in FIG. 3, as appropriate. The electronic device 1 according to an embodiment may also be configured to include at least one of the receiving antenna 31, the LNA 32, the mixer 33, the IF part 34, and the AD converter 35, as appropriate, in place of or together with the functional parts described above. Further, the electronic device 1 according to an embodiment may be configured to include the storage 40 and the like, as appropriate. Thus, the electronic device 1 according to an embodiment may be configured in various ways. Further, when the electronic device 1 according to an embodiment is mounted on the mobile body 100, for example, at least one of the functional parts described above may be installed in a suitable location, such as inside the mobile body 100. On the other hand, in an embodiment, for example, at least any one of the transmitting antenna 25 and the receiving antenna 31 may be installed outside the mobile body 100.

REFERENCE SIGNS LIST

1 Electronic device
5 Sensor
10 Controller
12 Distance FFT processor
14 Speed FFT processor
16 Arrival angle estimator
18 Determination estimator
20 Transmitter
21 Signal generator
22 Synthesizer
23 Phase controller
24 Amplifier
25 Transmitting antenna
30 Receiver
31 Receiving antenna
32 LNA
33 Mixer
34 IF part
35 AD converter
40 Storage
42 Clustering processor
44 Tracking processor
46 Update processor
100 Mobile body
200 Object (Body)

The invention claimed is:

1. An electronic device comprising:
 a controller configured to be communicably coupled with a transmitting antenna and a receiving antenna, the controller being configured to:
  detect an object reflecting transmitted waves based on transmitted signals transmitted from the transmitting antenna as the transmitted waves and received signals received from the receiving antenna as reflected waves obtained by reflection of the transmitted waves;
  determine that the object has been detected when a peak in a result obtained by performing a Fourier transform process on beat signals generated based on the transmitted signals and the received signals is equal to or higher than a predetermined threshold value; and
  set the predetermined threshold value based on an object detection probability.

2. The electronic device, according to claim 1, the controller being further configured to determine whether the detection of the object has been successful based on a result obtained by performing a clustering process on the result obtained by performing the Fourier transform process on the beat signals.

3. The electronic device, according to claim 2, the controller being further configured to determine that the detection of the object has been successful when it is determined that the object exists as the result obtained by performing the clustering process.

4. The electronic device, according to claim 2, the controller being further configured to determine that the detection of the object has not been successful when it is estimated that the object exists as a result obtained by performing a tracking process on the result obtained by performing the clustering process.

5. The electronic device, according to claim 1,
 wherein the predetermined threshold value is selected from a plurality of threshold value candidates, and an object detection probability is associated with each of the plurality of threshold value candidates.

6. The electronic device, according to claim 5,
 wherein the predetermined threshold value is preferentially selected from among the plurality of threshold value candidates with a higher object detection probability associated with each of the plurality of threshold value candidates.

7. The electronic device, according to claim 5,
 wherein an object detection probability associated with each of the plurality of threshold value candidates is updated based on determination of whether the detection of the object has been successful when the predetermined threshold value is set.

8. The electronic device, according to claim 7,
 wherein when an object detection probability associated with each of the plurality of threshold value candidates is updated, the predetermined threshold value is set based on the updated object detection probability.

9. The electronic device, according to claim 5,
 wherein under a predetermined condition, the predetermined threshold value is selected from among the plurality of threshold value candidates other than a threshold value with a highest object detection probability associated with each of the plurality of threshold value candidates.

10. A method of operating an electronic device comprising a controller communicably coupled to a transmitting antenna and a receiving antenna, the method including:
   a step of controlling, via the controller, the transmitting antenna to transmit transmitted signals as transmitted waves;
   a step of receiving, at the controller, received signals from the receiving antenna as reflected waves obtained by reflection of the transmitted waves;
   a step of detecting, via the controller, an object reflecting the transmitted waves based on the transmitted signals and the received signals;
   a step of determining, via the controller, that the object has been detected when a peak in a result obtained by performing a Fourier transform process on beat signals generated based on the transmitted signals and the received signals is equal to or higher than a predetermined threshold value; and
   a step of setting, via the controller, the predetermined threshold value based on an object detection probability.

11. A non-transitory computer-readable recording medium storing computer program instructions, which when executed by an electronic device comprising a controller communicably coupled to a transmitting antenna and a receiving antenna, cause the controller to:
   control the transmitting antenna to transmit transmitted signals as transmitted waves;
   receive received signals from the receiving antenna as reflected waves obtained by reflection of the transmitted waves;
   detect an object reflecting the transmitted waves based on the transmitted signals and the received signals;
   determine that the object has been detected when a peak in a result obtained by performing a Fourier transform process on beat signals generated based on the transmitted signals and the received signals is equal to or higher than a predetermined threshold value; and
   set the predetermined threshold value based on an object detection probability.

12. The electronic device, according to claim 4,
   the controller being further configured to determine that:
      the detection of the object has been successful when it is estimated that the object exists as the result obtained by performing the clustering process, and
      the detection of the object has not been successful when it is estimated that the object exists as the result obtained by performing the tracking process.

* * * * *